United States Patent Office.

WILLIAM T. JEBB, OF BUFFALO, NEW YORK.

METHOD OF PREPARING AND TREATING STARCH.

SPECIFICATION forming part of Letters Patent No. 320,361, dated June 16, 1885.

Application filed May 18, 1885. (No specimens.)

*To all whom it may concern:*

Be it known that I, WILLIAM T. JEBB, of the city of Buffalo, in the county of Erie and State of New York, have invented a new and useful Improvement in the Method of Preparing and Treating Starch, of which the following is a specification.

This invention relates to an improvement in the manufacture of beer and ale from barley-malt and the starch extracted from Indian corn or maize.

The object of this invention is to utilize the starch contained in the Indian corn for producing a heavy, light-colored wort, without imparting to the malt-liquor an objectionable taste or flavor or impairing its keeping qualities, by extracting from the corn in a simple and inexpensive manner a crude starch which is substantially free from impurities, and then producing a wort from this starch in connection with barley-malt.

In practicing my invention, the corn is first steeped in a suitable vat or tank, which is provided with a perforated false bottom for draining, at a temperature of about 140° Fahrenheit, for about fifteen hours, and this temperature is maintained in the steep by renewing the water from time to time from a tank containing hot water. The temperature is preferably not allowed to rise to 155° Fahrenheit, as it would cause the starch-cells to burst and render the subsequent recovery of the starch difficult, if not impossible. When the steeping is completed, the kernels of corn have become expanded, swelled, and softened by the combined action of the heat and moisture, and the hulls and germs tend to separate from the starchy portions of the kernels, so that these component parts of the kernels are only loosely held together and in a condition in which they can be partially detached from each other by the following process: The warm water is now drawn from the steep and cold water is introduced into the same, whereby the corn is cooled or chilled. This not only presents the corn to the subsequent operation of reduction in a cold state, but also tends to toughen the hulls and germs and renders them less liable to become finely pulverized in reducing the kernels. The water is next drained thoroughly from the corn in the steep-vat, a period of from four to six hours being usually allowed for this purpose. The steeped corn, after having been thoroughly drained, is next reduced in a suitable mill, which is preferably a disk-mill, in which one disk has a slight eccentric movement with reference to the other, and which is known as the "Bogardus Mill;" or, if preferred, a roller-mill or other reduction-machine, whereby the corn is coarsely ground or crushed, may be employed for this purpose. By this machine the corn is coarsely ground or reduced, whereby the hulls and germs are to a large extent detached from the starchy portions of the kernels in comparatively large fragments, while the starchy portions are more finely reduced, so that a large proportion of the starch can be separated from the fragments of hulls and broken germs. This is accomplished by a suitable vibrating or rolling screen, which is so clothed that the starch passes through the meshes of the screen, while the hulls and broken germs tail off together; or, if desired, the reduced material may be divided by the screen into a number of different products of different degrees of fineness, the finest product being crude starch, while the coarser products consist of fragments of hulls and broken germs containing a greater or less admixture of starch. The crude starch may now be further treated; but before doing so it is preferably subjected to a second reducing operation, whereby it is reduced to a higher degree of fineness. The tailings or coarse products are also preferably reduced again for the purpose of detaching the starch which may adhere to the fragments of hulls and germs, and this detached starch is separated by a second sifting operation and added to the starch of the first separation. The crude starch or starch-meal so obtained from the corn is next boiled with water in a closed tank under a steam-pressure of about forty pounds to the square inch for a number of hours until the starch has been fully developed and prepared for mashing. This tank is provided with suitable steam-pipes and a safety-valve and pressure gage for regulating the process of developing the starch. The developed starch is then discharged from this tank into the mash-tub, where it is mashed together with a suitable quantity of barley-malt, the proportions of the starch and barley-malt depending somewhat upon the nature of the product which is to be produced; or, if preferred, the starch and the barley-malt may each be mashed separately and the worts derived from both mashes may be mixed before boiling the same. The developed starch is readily converted in the process of mashing, and produces a heavy, clear wort of light color, which is free from the objectionable impurities and flavors ordinarily found in worts made from cornmeal, and which does not impair the keeping qualities of the beer. When the process of mashing is completed, the wort is drained off and drawn into the copper or boiler, in which it is boiled, and in which the hops are added. The boiled wort is then drained through the hops in the hop-back, and cooled, fermented, stored, or treated in any usual or well-known manner.

The beer or ale produced in this manner is strong and wholesome, free from any objectionable taste or flavor, and keeps well when stored. It can be produced of a very light color, if desired, by selecting pale barley-malt, as the coloring ingredients of the corn have been substantially removed.

I claim as my invention—

1. The herein-described method of producing a wort suitable for the manufacture of beer or ale, which consists in steeping the corn, then draining the corn, then coarsely crushing or grinding the corn, then separating the crude starch from the coarse offal by sifting, then mashing the separated starch and the barley-malt, and draining off the wort, substantially as set forth.

2. The herein-described method of producing a wort suitable for the manufacture of beer or ale, which consists in steeping the corn, then draining the corn, then coarsely crushing or grinding the corn, then separating the crude starch from the coarse offal by sifting, then developing the crude starch under pressure, then mashing the developed starch and the barley-malt, and draining off the wort, substantially as set forth.

3. The herein-described method of manufacturing beer or ale, which consists in steeping the corn, then draining the corn, then coarsely crushing or grinding the corn, then separating the crude starch from the coarse offal by sifting, then mashing the separated starch and the barley-malt and draining off the wort, then boiling the wort, adding the hops, draining off the liquid, and cooling and fermenting the same, substantially as set forth.

Witness my hand this 16th day of May, 1885.

WILLIAM T. JEBB.

Witnesses:
WALTER K. GRIFFIN,
S. R. CHASE, Jr.